UNITED STATES PATENT OFFICE.

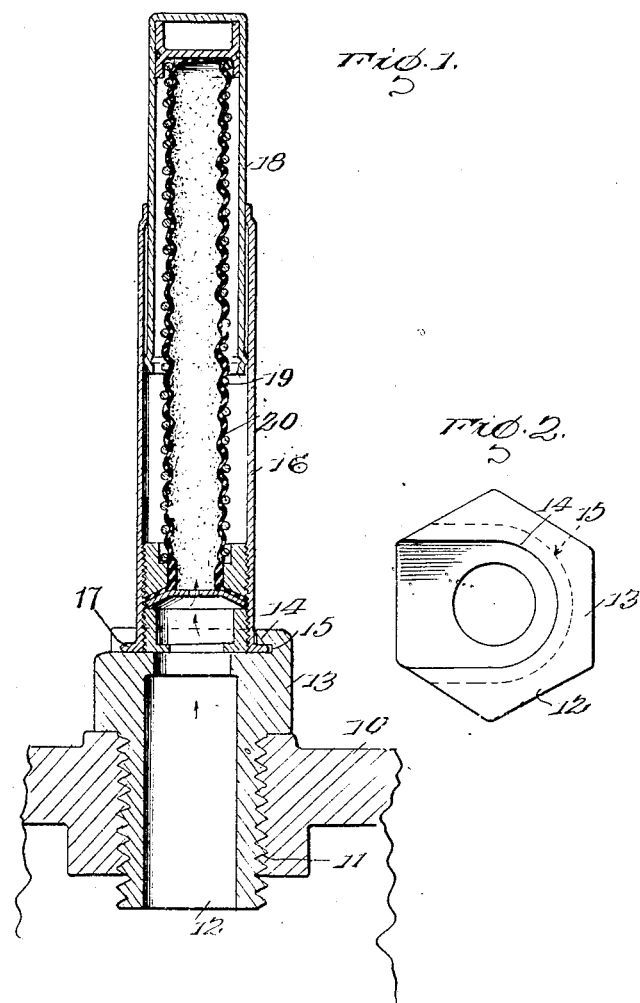

LEO M. KNAPP, OF WELLSVILLE, NEW YORK.

COMPRESSION-TESTER.

1,337,455.  Specification of Letters Patent.  Patented Apr. 20, 1920.

Application filed March 1, 1919. Serial No. 280,075.

*To all whom it may concern:*

Be it known that I, LEO M. KNAPP, a citizen of the United States, residing at Wellsville, in the county of Allegany and State of New York, have invented certain new and useful Improvements in Compression-Testers, of which the following is a specification.

This invention has relation to testing devices with particular reference to the testing of the compression of internal combustion engines, and has for an object to provide a device to be inserted into the spark plug opening of the cylinder with means for indicating in pounds per square inch the compression of the cylinder under examination.

In addition to the foregoing, this invention comprehends improvements in the details of construction and arrangement of parts, to be hereinafter described and particularly set forth in the appended claim.

In the accompanying drawings in which similar and corresponding parts are designated by the same characters of reference throughout the several views in which they appear.

Figure 1 is a view in section of a device constructed in accordance with my invention for testing compression.

Fig. 2 is a view in plan of a holder for the testing device.

With reference to the drawings, 10 indicates the engine cylinder having the threaded spark plug opening 11, and 12 a hollow threaded plug to enter the opening. The upper end of the plug is formed with a hexagonal wrench engaging portion 13, and the upper surface of said portion is formed with a substantially semi-circular flange 14 having an undercut recess 15.

In connection with the plug 12 I may use a conventional form of pneumatic tire pressure gage consisting of a tubular casing 16 having a flange 17 at its lower end to enter the recess 15, the casing being inserted beneath the flange laterally. A tubular indicator 18 slides in the casing and interposed between the upper end of said member 18 and the lower end of the casing 16 is a coiled spring 19. A rubber casing 20 is inclosed within the spring, and communicates at its lower end with an opening at the lower end of the casing 16, said opening in turn communicating with the interior of the plug 12.

In operation, pressure within the cylinder as a result of movement of the piston on a compression stroke will cause the rubber casing to expand and push the indicator 18 upwardly against the tension of the spring 19. The spring and rubber casing may collapse upon the succeeding exhaust stroke but the indicator 18 will remain at its moved position, thus indicating by the proximity to the upper end of the casing 16 of graduations on its surface the amount of pressure within the cylinder.

Thus, with my testing device the compression of any automobile engine may be tested to determine the pressure of leaky piston rings, cylinder cracks or other faults. Other uses may readily occur to those skilled in the art to which this invention appertains.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claim.

Having thus described my invention, what I claim as new and desire to secure by United States Letters Patent is:

A compression tester comprising a plug having a longitudinal explosion passage extending therethrough, and having an exterior portion threaded, a hexagonal enlargement at one end thereof, an annular radial flange at the termination of said enlarged portion and interiorly thereof, a semicircular flange formed on the end face of said hexagonal portion having its walls undercut or reset concentrically relative to the explosion opening of the plug, and a gage comprising a stationary element and a movable element, and an annular flange on one end of said stationary element adapted to be inserted within the undercut portion of the semicircular flange, the latter serving to engage the semi-circular flange to secure the gage in place and to aline the center of the gage with the center of the explosion opening of the plug for the purpose set forth.

In testimony whereof I affix my signature in presence of two witnesses.

LEO M. KNAPP. [L. S.]

Witnesses:
 LE ROY D. RIDER,
 J. FARNUM BROWN.